United States Patent
Adl-Tabatabai et al.

(10) Patent No.: US 8,555,016 B2
(45) Date of Patent: Oct. 8, 2013

(54) UNIFIED OPTIMISTIC AND PESSIMISTIC CONCURRENCY CONTROL FOR A SOFTWARE TRANSACTIONAL MEMORY (STM) SYSTEM

(75) Inventors: Ali-Reza Adl-Tabatabai, San Jose, CA (US); Moshe Bach, Haifa (IL); Sion Berkowits, Nesher (IL); James Henry Cownie, Bristol (GB); Yang Ni, Sunnyvale, CA (US); Jeffrey V. Olivier, Champaign, IL (US); Bratin Saha, Santa Clara, CA (US); Ady Tal, Zichron Yaacov (IL); Adam Wele, Mountain View, CA (US)

(73) Assignee: Intel Corporation, santa Clara, CA (US)

( * ) Notice: Subject to any disclaimer, the term of this patent is extended or adjusted under 35 U.S.C. 154(b) by 876 days.

(21) Appl. No.: 12/337,507

(22) Filed: Dec. 17, 2008

(65) Prior Publication Data

US 2010/0153953 A1 Jun. 17, 2010

(51) Int. Cl.
*G06F 12/00* (2006.01)

(52) U.S. Cl.
USPC .............. 711/163; 711/168; 711/216

(58) Field of Classification Search
USPC .................................. 711/154; 707/2, 8
See application file for complete search history.

(56) References Cited

U.S. PATENT DOCUMENTS

2008/0034172 A1* 2/2008 Duffy et al. .................. 711/156

* cited by examiner

*Primary Examiner* — John Lane
(74) *Attorney, Agent, or Firm* — Barnes & Thornburg LLP (57) ABSTRACT

A method and apparatus for unified concurrency control in a Software Transactional Memory (STM) is herein described. A transaction record associated with a memory address referenced by a transactional memory access operation includes optimistic and pessimistic concurrency control fields. Access barriers and other transactional operations/functions are utilized to maintain both fields of the transaction record, appropriately. Consequently, concurrent execution of optimistic and pessimistic transactions is enabled.

26 Claims, 6 Drawing Sheets

UNIFIED OPTIMISTIC AND PESSIMISTIC CONCURRENCY CONTROL FOR A SOFTWARE TRANSACTIONAL MEMORY (STM) SYSTEM

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. Yet, the complexity for a programmer to manage a lock for each entry becomes extremely cumbersome. Either way, after extrapolating this simple example into a large scalable program, it is apparent that the complexity of lock contention, serialization, fine-grain synchronization, and deadlock avoidance is an extremely large burden for programmers.

Another recent data synchronization technique includes the use of transactional memory (TM), which may also be referred to as transactional execution. Often, transactional memory includes executing a group of a plurality of micro-operations, operations, or instructions. This group of operations/instructions is usually referred to as an atomic or critical section. In the example above, both threads execute within the hash table, and their accesses are monitored/tracked. If both threads access/alter the same entry, conflict resolution may be performed to ensure data validity. One type of transactional execution includes a Software Transactional Memory (STM), where accesses are tracked, conflict resolution, abort tasks, and other transactional tasks are primarily performed in software.

To accomplish tracking memory accesses in an STM, access barriers are inserted by a compiler at memory accesses in transactional program code. Often meta-data, which may be referred to as transaction records, are associated with memory addresses to provide appropriate access to and ownership of the associated memory addresses. Unfortunately, based on the implementation of how the transaction records are utilized and what level of exclusion they provide, a trade-off between performance and data validity under certain conditions exist. Currently, there is no unified concurrency control for a software transactional memory (STM) system.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific Software Transactional Memory (STM) system details, specific barrier implementation, specific meta-data implementation, etc. in order to provide a thorough understanding of the present invention. It will be apparent, however, to one skilled in the art that these specific details need not be employed to practice the present invention. In other instances, well known components or methods, such as alternate transactional memory implementations, specific multi-core and multi-threaded processor architectures, transaction hardware, specific transactional memory library contents and distribution, specific compiler methods, implementations, and phases, such as code insertion and transactional memory transformation have not been described in detail in order to avoid unnecessarily obscuring the present invention.

The method and apparatus described herein are for providing a unified concurrency control Software Transactional Memory System (STM). Specifically, unified concurrency control is primarily discussed in reference to an illustrative Software Transactional Memory (STM) system. However, the methods and apparatus for unified concurrency control are not so limited, as they may be implemented in associated with any transactional memory system and any transactional memory implementation details.

Figure 1:
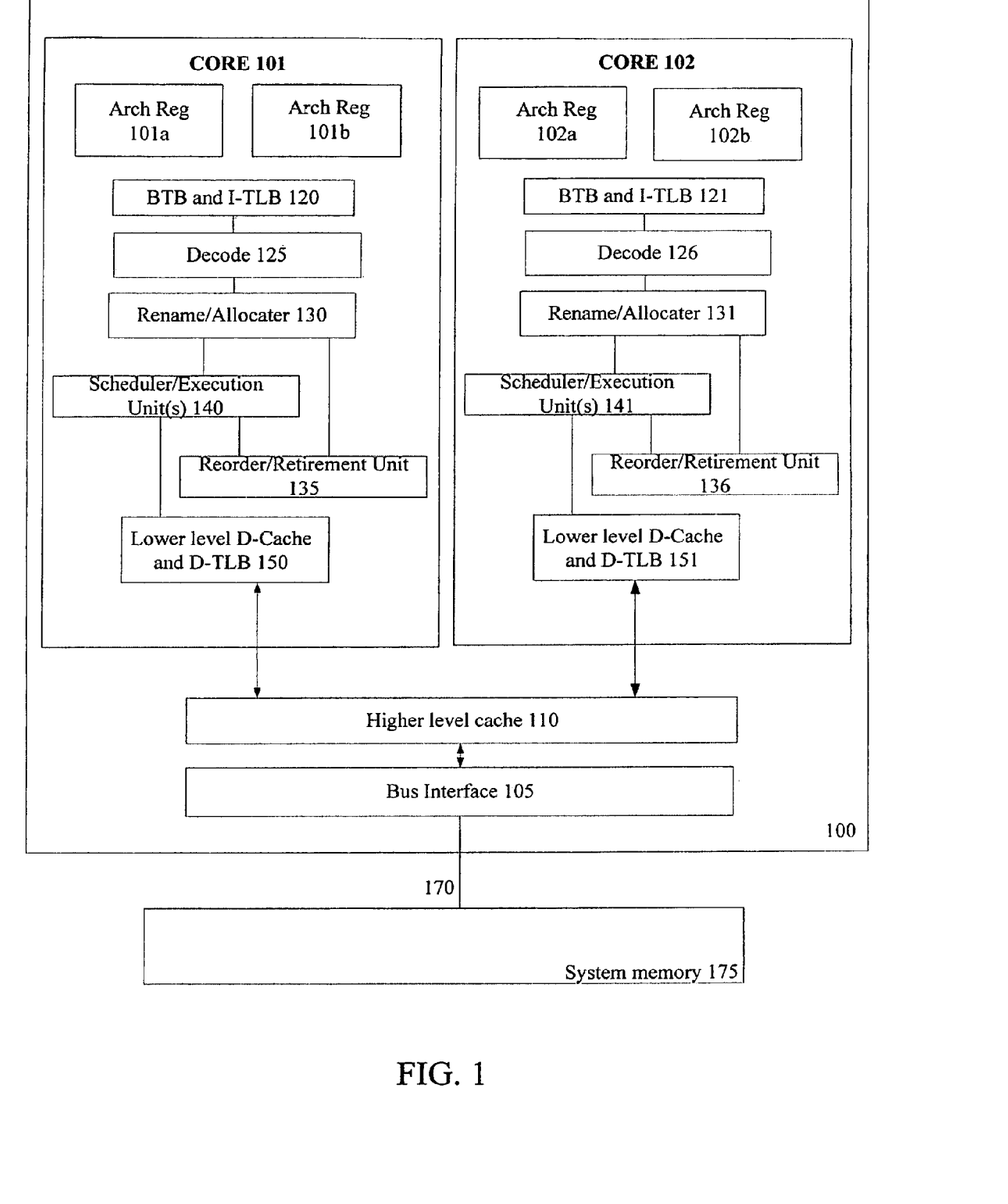
FIG. 1 illustrates an embodiment of a processor including multiple processing elements capable of executing multiple software threads.

Referring to FIG. 1, an embodiment of a processor capable of executing multiple threads and code for a Software Transactional Memory (STM) is illustrated. Processor 100 may also include hardware support for hardware transactional execution and/or hardware acceleration of an STM. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a process unit, a context, a logical processor, a hardware thread, a core, and/or any other element, which is capable of holding at least a portion of a state for a processor, such as an execution state or architectural state. In other words, a processing element, in one embodiment, refers to any hardware capable of being independently associated with code, such as a software thread, operating system, application, virtual machine, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread, which may also be referred to as a physical thread, typically refers to any logic located on an integrated circuit capable of maintaining at least a portion of an independent architectural state wherein the independently maintained architectural state share access to execution resources. As can be seen, when certain resources are shared and others are dedicated to an architectural state, the line between the nomenclature of a hardware thread and core overlaps. Yet often, a core and a hardware thread are viewed by an operating system as individual logical processors or processing elements, where the operating system is able to individually schedule operations on each logical processor/processing element.

Physical processor 100, as illustrated in FIG. 1, includes two cores, core 101 and 102, which share access to higher level cache 110. Although processor 100 may include asymmetric cores, i.e. cores with different configurations, functional units, and/or logic, symmetric cores are illustrated in FIG. 1. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four processing elements capable of independently executing four active software threads.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocator logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of exemplary functional units/resources of a processor is illustrated. Note that a processor may include, or omit, any of these functional units, as well as include any other known functional units, logic, or firmware not depicted.

As illustrated, processor 100 includes bus interface module 105 to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched elements from higher-level cache 110. Note that higher-level or further-out refers to cache levels increasing or getting further way from the execution unit(s). In one embodiment, higher-level cache 110 is a second-level data cache. However, higher level cache 110 is not so limited, as it may be associated with or include an instruction cache. A trace cache, i.e. a type of instruction cache, may instead be coupled after decoder 125 to store recently decoded traces. Module 120 also potentially includes a branch target buffer to predict branches to be executed/taken and an instruction-translation buffer (I-TLB) to store address translation entries for instructions.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 110a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

In one embodiment, processor 100 is capable of transactional execution. A transaction, which may also be referred to as a critical or atomic section of code, includes a grouping of instructions, operations, or micro-operations to be executed as an atomic group. For example, instructions or operations may be used to demarcate a transaction or a critical section. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible.

However, if the transaction is invalidated during its pendancy, the transaction is restarted without making the updates globally visible. As a result, pendency of a transaction, as used herein, refers to a transaction that has begun execution and has not been committed or aborted, i.e. pending. Example implementations for transactional execution include a Hardware Transactional Memory (HTM) system, a Software Transactional Memory (STM) system, and a combination thereof.

A Hardware Transactional Memory (HTM) system often refers to tracking access during execution of a transaction in hardware of processor 100. For example, cache 150 is to cache a data item/object from system memory 175 for use by processing elements 110*a* and 101*b*. During execution of a transaction, an annotation/attribute field is associated with a cache line in cache 150, which is to hold the data object. The annotation field is utilized to track accesses to and from the cache line. In one embodiment, if a write to a cache line that has previously tracked a load during a transaction occurs, then a data conflict is detected utilizing the cache line annotations.

A Software Transactional Memory (STM) system often refers to performing access tracking, conflict resolution, or other transactional memory tasks in, or at least partially in, software. In one embodiment, processor 100 is utilized to execute compiler code for compilation of program code to insert calls to read and write barriers for transactional load and store operations, accordingly. A compiler may also insert other transactional related operations, such as commit operations, abort operations, bookkeeping operations, conflict detection operations, and strong atomicity operations.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

As stated above, larger compilers tend to include multiple phases, but these phases typically are included within two general compilation phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler.

In one embodiment, processor 100 may be utilized to execute program code, which includes transactional operations, instructions, calls, and functions, as well as other non-transactional operations, instructions, calls, and functions. Additionally, reference to execution of program code, in one embodiment, refers to execution of one or both of main program code and other program code, such as libraries, associated with the main program code. For example, during compilation of main code transactional memory related operations are inserted, such as a call to a write barrier at a transactional store operation. Additionally, a transactional library may be separately provided to include the write barrier function. Here, a potential advantage of this implementation includes the capability of updating write barrier functionality without recompilation of the main code.

Whether code for an STM is generated as part of main code or a library, in one embodiment, the code, when executed, is to utilize a unified concurrency control STM. As an example, both optimistic and pessimistic concurrency control values are maintained in unified transaction records to enable execution of both optimistic and pessimistic transactions concurrently on processor 100. In one embodiment, a compiler inserts calls to a transactional write barrier at store operations the compiler determines the transactional write barrier is needed. As an example, the write barrier, which may be provided in a transactional library, is to acquire pessimistic and/or optimistic write locks, accordingly. Similarly, calls to read barriers are inserted at load operations; the read barriers to handle optimistic and pessimistic transactional reads.

As a consequence of enabling concurrent execution of pessimistic and optimistic transactions, in one embodiment, an STM is capable of dynamically determining if a transaction is to be executed optimistically or pessimistically based on any number of factors. Furthermore, a transaction may be converted from one mode to another, such as from optimistic to pessimistic, part-way through execution of the transaction. As a result, a user preference, either separately or in combination with, dynamic characteristics of a transaction may be utilized to determine the most efficient mode to execute a transaction. Illustrative embodiments of unified transaction records, write-barriers, read-barriers, dynamic determination of a transactions mode of execution, switching of modes of transactional execution, and other unified concurrency control characteristics are discussed in more detail below in reference to FIGS. 2-6.

Although the discussion herein is primarily focused on the example where main code includes calls to access barriers, and other code, such as a library, includes access barrier functions, the apparatus and methods described herein are not so limited, as any provided code, hardware, and/or firmware may be utilized for the methods described below. As another example, a compiler potentially inserts all the operations in the main code instead of separating functionality between application code and a library. Yet, any combination of compiler inserted/transformed code along with separately provided code, such as a library, may be utilized.

Figure 2:
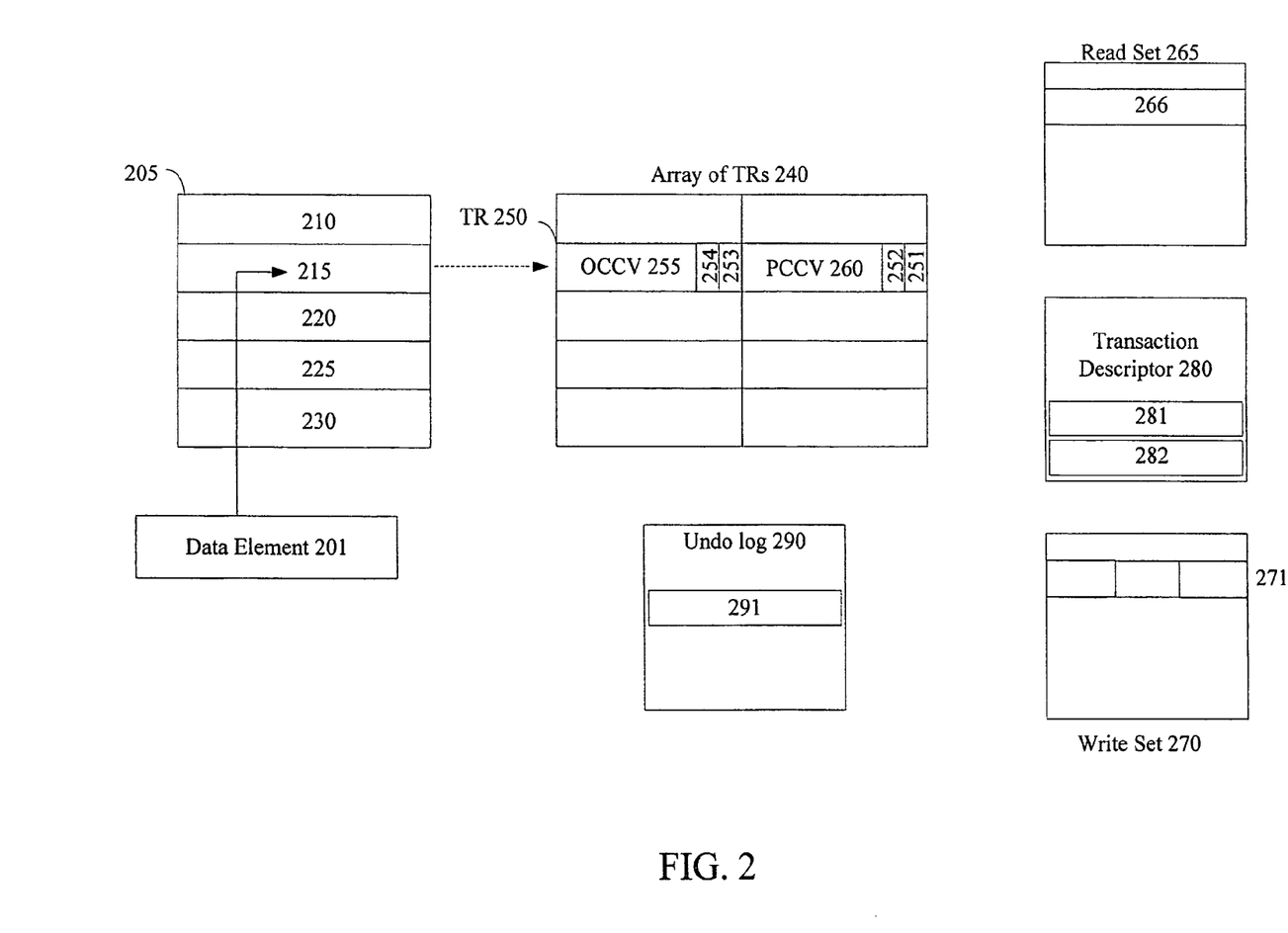
FIG. 2 illustrates an embodiment of a unified concurrency control Software Transaction Memory (STM) system.

Referring to FIG. 2, a simplified illustrative embodiment of a unified concurrency control STM system is depicted. Note that the discussion of FIG. 2 is primarily in reference to specific implementation of an STM system. In that regard, discussion of certain transactional memory implementation details, such as direct versus indirect referencing and update-in place versus write-buffering are provided to illustrate a few of the design choices that may be made when implementing a transactional memory system. However, the methods and apparatus described herein for a unified concurrency control STM may be implemented in any transactional memory system, such as a hardware accelerated STM, a hybrid STM, or other known transactional memory system, as well as in conjunction with any known transactional memory implementation details.

In one embodiment of an STM, memory locations and/or data elements, such as data element 201 to be held in cache line 215, are associated with meta-data locations, such as meta-data location 250 in array 240. As an illustrative example, an address, or a portion thereof, associated with data element 201 and/or line 215 of cache memory 205 is hashed to index location 250 in array 240. Often, in regards to transactional memory, meta-data location 250 is referred to as a transaction record, while array 240 is referred to as an array of transaction records. Although transaction record 250, as illustrated, is associated with a single cache line, a transaction record may be provided at any data granularity level, such as a size of data element 201, which may be smaller or larger than cache line 215, as well as include an operand, an object, a class, a type, a data structure, or any other element of data.

Often in a STM, transaction record (TR) 250 is utilized to provide different levels of ownership of and access to an associated memory address, such as data element 201. In one embodiment, TR 250 includes two fields, Optimistic Concurrency Control (OCC) field 255 and Pessimistic Concurrency Control (PCC) field 260. Here, OCC field 255 and PCC field 260 are maintained to enable concurrent execution of optimistic and pessimistic transactions. To further the discussion of each, embodiments of an optimistic STM and a pessimistic STM are discussed immediately below to illustrate their operation. However, in one embodiment, a unified concurrency control STM utilizes aspects of both an optimistic and pessimistic STM.

In one embodiment, OCC field 255 is to hold an optimistic concurrency control (OCC) value. Different OCC values may be utilized to represent different optimistic ownership states. In one embodiment, OCC field 255 holds an optimistic version or timestamp value to indicate an optimistic unlocked state and holds a reference, such as a pointer, to a transaction descriptor, such as transaction descriptor 280, to represent an optimistic locked state, such as an exclusive write lock state. Usually, transaction descriptor 280 holds information describing a transaction, such as transaction ID 281 and transaction state 282. The above described example of utilizing a pointer to transaction descriptor 280 to identify a transaction owning OCCV field 255 of TR 250 is often referred to as a direct reference STM, where OCC field 255 holds a direct reference to transaction descriptor 280 of owning transaction 281. Note that ownership of OCC field 255 may also be referred to as owning an optimistic lock of transaction record 250 or other variation referring to an optimistic ownership associated with OCC field 255 and/or TR 250.

In another embodiment, an owned or locked value includes a reference to a write set entry, such as write entry 271 of write set 270. In one embodiment, write entry 271, which is associated with a store/write operation, is to hold a logged version number from transaction record 250 before the lock is acquired, a pointer to transaction descriptor 280 to indicate that transaction 281 is associated with write entry 271, and a back pointer to transaction record 250. This example is often referred to as an indirect reference STM, where TR 250 references an owning transaction indirectly, i.e. through write entry 271.

A portion of OCC field/value 255, in one embodiment, is utilized to indicate if the optimistic portion of TR 250 is owned or locked. In one example, single bit 253, which is the Least Significant Bit (LSB), is utilized to indicate if TR 250 is optimistically owned. As an illustration, if LSB 253 is set to a first logical value, such as a logical one, then OCC field 255/TR 250 is optimistically unlocked. In contrast, a second logical value, such as a logical zero, indicates that OCC field 255/TR 250 is optimistically locked. Here, when a version value is utilized to indicate an optimistic unlocked state, then each version value is odd, i.e. the LSB is set to a logical one. In contrast, each locked value, such as a reference to a transaction descriptor or write set entry, includes an even value, i.e. LSB 253 set to a logical zero. As a consequence, a basic ownership test may check LSB 253 to determine if TR 250 is optimistically unlocked or locked.

Note that the embodiments with regard to an Optimistic STM are purely illustrative. As a first example, logical levels may be inverted, such as a logical zero to indicate a locked state and a logical one to indicate an unlocked state. As another example, multiple bits, such as bits 253 and 254, may be utilized to encode representations of different locked and unlocked states. Table A below includes an illustrative example of multiple bit encoding for OCC field 255.

TABLE A

Embodiment of Transaction Record Optimistic Field Encodings

| Encoding | State | Value in upper bits |
| --- | --- | --- |
| xx ... xx11 | Shared Read (unlocked) | Version/Timestamp |
| xx ... xx10 | Shared Read Single Owner Write Lock | Version/Timestamp |
| xx ... xx00 | Exclusive Write Lock | *Tx Descriptor |

As can be seen, three ownership states are illustrated in Table A. When bits 254 and 253 are set to 11, transaction record 250 is in an optimistic shared read state, i.e. other transactions are able to read data element 201 and/or acquire an optimistic lock of transaction record 250/data element 201. In addition, when the bit pattern is 10, transaction record 250 indicates a single owner shared read lock. Here, other transactions may read data element 201, while only the owner, such as transaction 281, is allowed to write to data element 201. Finally, when the bit pattern is a 00, then transaction record 250 is optimistically exclusively write locked, where only the owner is able to read and/or write to data element 201.

Similar to OCC field 255, which is to hold optimistic concurrency control values, Pessimistic Concurrency Control (PCC) field 260 is to hold pessimistic concurrency control values. In contrast to a version or pointer value in OCC field 255, in one embodiment of a pessimistic concurrency control STM, PCC 260 holds a bit vector. The higher order bits represent executing transactions, while LSB 251 and $2^{nd}$ LSB 252 represent a write lock state and an unlocked/shared read state. In a shared read state, the higher bits that are set represent corresponding transactions that have a pessimistic read lock of transaction record 250. In a locked state, one of the higher bits are set to indicate which of the transactions has write locked data element 201.

TABLE B

Embodiment of Transaction Record Pessimistic Field Encodings

| Encoding | State | Value in upper bits |
| --- | --- | --- |
| 00 ... xx01 | unlocked | Zero'd Bit Vector |
| xx ... xx01 | Shared Read Lock | Non-zero bit-vector reader Txs |
| xx ... xx11 | Shared Read lock with Pending Upgrade | Non-zero bit-vector reader Txs |
| xx ... xx00 | Write lock by Optimistic Tx | Zero |
| xx ... xx00 | Write Locked by Pessimistic Tx | Bit Mask of Writer Tx |

An embodiment of encodings for PCC field 260 is illustrated in Table B above. Here, when LSB 251 includes a high logical value, i.e. a logical one, transaction record 250 is pessimistically unlocked or in a shared read lock state. As a result, transactions may read data element 201. The difference between the unlocked state and the shared read lock state is in the upper bits of PCC field 260, such that when completely unlocked the bit vector is zeroed, i.e. no read owners, and when a reader is present, the corresponding bit in the upper bit vector is set.

Additionally, the shared read lock with pending upgrade also has LSB 251 set to a logical one. Often, this state is obtained when a potential writer wants to acquire a write lock, but readers currently have read locks, as indicated by the upper bit vector. In one embodiment, a potential writer waits for current readers to release their read locks. As an example, to ensure the write is able to upgrade to a write lock, new readers are not allowed to acquire new read locks. Therefore, once all of the current readers have committed or aborted, PCC field 260 upgrades from the shared read lock with pending upgrade state to the write locked state.

Conversely from the unlocked and shared read lock states, when TR 250 is pessimistically locked, LSB 251 includes a logical zero value. Similar to the previous discussion, the difference between the two illustrated write lock states in Table B lies with the upper value bits. When the upper bits are zeroed and LSB 251 includes a logical zero, then TR 250 is write locked by an optimistic transaction, as indicated by no bit being set in the upper bit vector. In other words, TR 250 is pessimistically locked, but the upper bit vector indicates that no pessimistic transactions have ownership of TR 250. Consequently, it is inferred that an optimistic transaction has acquired ownership of TR 250. In contrast, if an upper bit of PCC field 260 is set along with bit 251 being zero, then TR 250 is pessimistically write locked by a pessimistic transaction corresponding to the upper bit being set.

In the discussion above, reference has been made to setting and resetting bits to logical values. For example, some discussion related to LSB 253 being set to a logical one or high logical value when OCC field 255 is unlocked. However, this is purely an illustrative example, as the meaning of a logical high value may be inverted, i.e. represent that OCC field 255 is locked. Additionally, reference to setting or resetting a bit refers to any known method of updating a bit position to a value. As one example, setting a bit includes updating a bit position in a register or other storage element to the value. However, more generally, setting a bit refers to any method of updating information that is capable of representing multiple states, such as a logical one or zero, such as an operation to update a value held in memory. In addition, use of "setting a bit" does not always refer to updating a bit to a high logical value, as it may refer to setting a bit to any desired value. Similarly, resetting may refer to resetting a bit to a default value, as well as resetting to a low logical value.

As of yet, the two fields of transaction record 250 have been discussed separately in conjunction with optimistic transactions executing utilizing OCC field 255 and pessimistic transactions executing utilizing PCC field 260. However, in one embodiment, maintaining transaction record 250 includes performing operations to ensure both fields are maintained for both modes of executing transactions appropriately.

Often in transactional memory systems, during compilation of program code, transactional calls/operations are inserted at appropriate memory accesses. For example, calls to access barriers are inserted at those appropriate memory accesses, as well as calls to other transactional operations and functions, such as commit and abort functions. In addition, libraries, such as a transactional runtime library, are usually provided to define functions/operations associated with those calls. As a result, a programmer may utilize rather basic language instructions, such as a start transaction instruction and end transaction instruction to demarcate an atomic or critical section of code and rely on the compiler in conjunction with the provided libraries to perform the bookkeeping and maintenance associated with execution of transactions in software.

A non-exhaustive list of exemplary common transactional functions to maintain software transactional structures includes a write barrier function, a read barrier function, a begin function, a commit function, an abort function, and other associated functions, such as a validate read set function. Often, use of the term barrier refers to bookkeeping or other maintenance operations to be performed at a memory access, such as interpreting states of transactions records 240 and updating those states, accordingly. Note that in a strong atomic system, or a version thereof, these barriers may be additionally inserted at all or some non-transactional memory accesses to ensure they do not invalidate data. Therefore, program code, in one embodiment, whether through execution of inserted operations, functions, access barriers, and calls or through execution of runtime libraries including operations, functions, access barriers, and calls, is to maintain both optimistic field 255 and pessimistic field 260 of transaction record 250. Exemplary barrier operations are discussed in more detail in reference to FIGS. 3-5.

Typically an access barrier is performed in response to encountering a memory access operation. In one embodiment, the operation is a transactional memory access operation, such as a transactional store operation or a transactional load operation. As another example, the operation includes a non-transactional operation determined to have an access barrier inserted. For example, in a fully strong atomic system, transactional access barriers are inserted at all non-transactional memory accesses. However, in some more intelligent compilers, the compiler is capable of determining non-transactional memory access operations that potentially conflict with shared data and only insert access barriers at those non-transactional operations.

Therefore, with regard to executing an access barrier or operations therein, encountering an operation, in one embodiment, includes encountering a call to the access barrier previously inserted at the operation. For example, assume the operation includes a transactional store/write operation. During compilation, the transactional store operation is encountered by the compiler and a call to a write barrier is inserted at the transactional store operation. During runtime execution, the transactional store operation is again "encountered" for execution. Yet, before the transactional store operation is performed, the inserted call to the write barrier is executed to perform associated write barrier operations. Consequently, reference herein to encountering a memory access operation or encountering an operation associated with the memory access operation, in one embodiment, refers to encountering an operation/call associated with an access barrier for the memory access operation.

Continuing reference to FIG. 2, illustrative embodiments of write barrier and read barrier operations to be performed to maintain unified concurrency control are discussed below. As stated above, access barrier operations, in one embodiment, are provided in a library, such as a transactional runtime library. Here, a call to the appropriate function is inserted in program code during compilation, and during runtime execution, the executed call vectors/jumps execution to the access barrier operations in the runtime library. In another embodiment, access barrier operations are inserted in the main program code to be directly executed. In addition, a combination of these two approaches may be utilized, where some access barrier operations are inserted in a main program and the other operations are provided in a library. As a result, the use of the term "program code" includes single application code, main program code, libraries, other known code distribution objects, or a combination thereof.

As a first example, assume a transactional write barrier is to be executed for a transactional store operation referencing data element 201 in response to encountering a call to the write barrier associated with the transactional store operation in a first transaction. In one embodiment, the memory address referencing data element 201 and/or cache line 215 is hashed to index transaction record (TR) 250 in array of transaction records 240. In one embodiment, there are multiple write barriers for different modes of transactions, such as a write barrier for an optimistic transaction and a write barrier for a pessimistic transaction. In an alternate embodiment, there is a single write barrier to perform write barrier operations for both optimistic and pessimistic transactions. Note that a single write barrier may still include multiple functions, such as a fast path write barrier, a slow path write barrier, and supporting functions, as described in more detail below.

In one embodiment of a unified write barrier, the write barrier, when executed, is to acquire ownership of one field of TR 250 before the other field. For example, the write barrier attempts to acquire ownership of pessimistic field 260 before acquiring ownership of optimistic field 255. As described above, PCC field 260 is to hold a pessimistic concurrency control value and OCC field 255 is to hold an optimistic concurrency control value. The write barrier, when executed, is to modify, update, or otherwise maintain these values to maintain transaction record 250, i.e. provide valid access to data element 201 based on the interpreted ownership values indicated by the fields of transaction record 250.

To illustrate, assume that pessimistic field 260 holds a logical high value in bit position 251 to indicate that pessimistic filed 260 is unlocked or in a shared read state. Furthermore, as described above, the high order bit vector of field 260 indicates there are current readers, other than the first transaction, which own a shared read lock of transaction record 250. As a result, the write barrier sets bit position 252 to a high logical value to indicate a shared read lock with pending upgrade for the first transaction. When the current readers commit or abort releasing their shared read locks in the bit vector, then the first transaction is allowed to upgrade to a write lock. In other words, the pessimistic concurrency control value is modified, such that bit position 251 holds a low logical value to indicate that pessimistic field 260 is write-locked.

In one embodiment, the write barrier includes a first operation or instruction, when executed, to test ownership of field 260. For example, the first operation or instruction includes a compare and exchange instruction. Here, if the compare portion of the instruction succeeds, i.e. bit 251 indicates PCC field 260 is unlocked, then bit 251 is exchanged/modified with the logical zero value to lock field 260. In other words, the compare and exchange instruction determines if the pessimistic ownership value held in field 260 indicates the pessimistic field 260 is not locked and modifies the pessimistic ownership value to a pessimistic locked value. However, if the compare fails, then the write barrier performs other operations, such as the pending upgrade path described above.

Continuing the example, after ownership of PCC field 260 is acquired, ownership of OCC field 255 is acquired. Previously, with separate optimistic and pessimistic STMs, which were unable to execute both optimistic and pessimistic transactions concurrently, a similar compare and exchange operation would be performed separately in both an optimistic and pessimistic system. In contrast, in one embodiment, after acquiring ownership of a first field, such as pessimistic field 260, through use of a compare and modify type of instruction, the second field, such as optimistic field 255, is acquired through use of a store type instruction. Essentially, the pessimistic field 260, in this example, operates as a lock for the optimistic field 255, and as a result, instead of having to perform the complex compare and exchange, a store operation may be utilized.

In one embodiment, acquiring ownership of OCC field 255 includes updating optimistic field 255 to hold a write-locked optimistic concurrency control value. For example, when unlocked, optimistic field 255 holds a version or timestamp value with bit 253 set to a logical one. Therefore, the store operation, in one embodiment, stores an optimistic locked value in field 255, such as a reference to a transaction descriptor associated with the first transaction or a reference to a write set entry associated with the write operation, in field 255. Here, bit 253 of the optimistic lock value is set to a logical zero.

Once the appropriate write locks are obtained, the transactional write operation is performed. After the transaction commits or aborts, the acquired locks are released. As mentioned above, in one example, pessimistic field 260 effectively operates as a write lock for optimistic field 255. Therefore, in one embodiment, ownership of optimistic field 255 is released, i.e. optimistic field 255 is updated to a version value or timestamp value (optimistic unlocked value) associated with the first transaction, before ownership of pessimistic field 260 is released, i.e. the corresponding ownership bit of the bit vector in PCC field 260 is reset and bit 251 is reset to a logical one (pessimistic unlocked value).

The example above referred to optimistic field 255 being acquired after pessimistic field 260 and being released before pessimistic field 255. However, any order of acquiring and releasing fields 255 and 260 may be utilized. Additionally, other values may be utilized to represent locked and unlocked values when held in optimistic and pessimistic fields of a transaction record.

As a corollary of executing a write barrier for a write operation, a read barrier may also be executed for a read operation. The read barrier is executed in response to encountering a read operation or an operation associated therewith, such as a call to the read barrier before, at, or after the read operation in the program flow. In one embodiment, different read barriers are provided for optimistic and pessimistic transactions. As an example where access barriers are provided in a library, both optimistic and pessimistic read barriers are included within the library. In this example, the compiler either determines the mode the transaction is to be executed in or assigns the transaction a default mode, such as an optimistic mode.

Additionally, in one embodiment, during runtime, it is dynamically determined which mode a transaction is to be executed in based on a characteristic of the transaction. As a result, a call to an optimistic read barrier is capable of being updated to a call to a pessimistic read barrier during runtime execution in response to switching modes of execution. Determining modes of execution, as well as switching modes of execution is discussed in more detail below with reference to FIG. 6.

In one embodiment, an optimistic and a pessimistic read barrier determine if a transaction record, such as TR 250, associated with a memory address, such as a memory address of data element 201 and/or cache line 215, referenced by a read operation within a transaction is not exclusively write locked. In one embodiment, if the transaction is optimistic, ownership bit 253 is checked to determine if transaction record 250 is optimistically locked. If the transaction is pessimistic, ownership bit 251 is checked in a similar manner to determine if transaction record 250 is pessimistically locked.

Once it is determined that transaction record 250 is unlocked or read shared, then the read operation is performed. For an optimistic transaction, the read may be directly performed without acquiring any read lock of transaction record 250. However, in one embodiment, for a pessimistic transaction, transaction record 250, and more specifically pessimistic field 260 of TR 250, is updated to a pessimistic shared read lock value to acquire a pessimistic shared read lock of TR 250 before the read is performed. As an example, the shared read lock includes setting a transaction bit in the upper bit vector of pessimistic field 260 corresponding to the transaction to a read owned value. As a result of the update, bit 251 still holds a logical one while the upper bit is set to a read owned value, which corresponds to the share read lock state, as depicted in Table B above.

As a result of utilizing read and write barriers to maintain optimistic and pessimistic fields of a transaction record, both optimistic and pessimistic transactions may be executed concurrently, since ownership for the associated data elements are maintained in a unified manner. Other embodiments of read and write barriers are discussed below in reference to FIG. 3.

Figure 3:
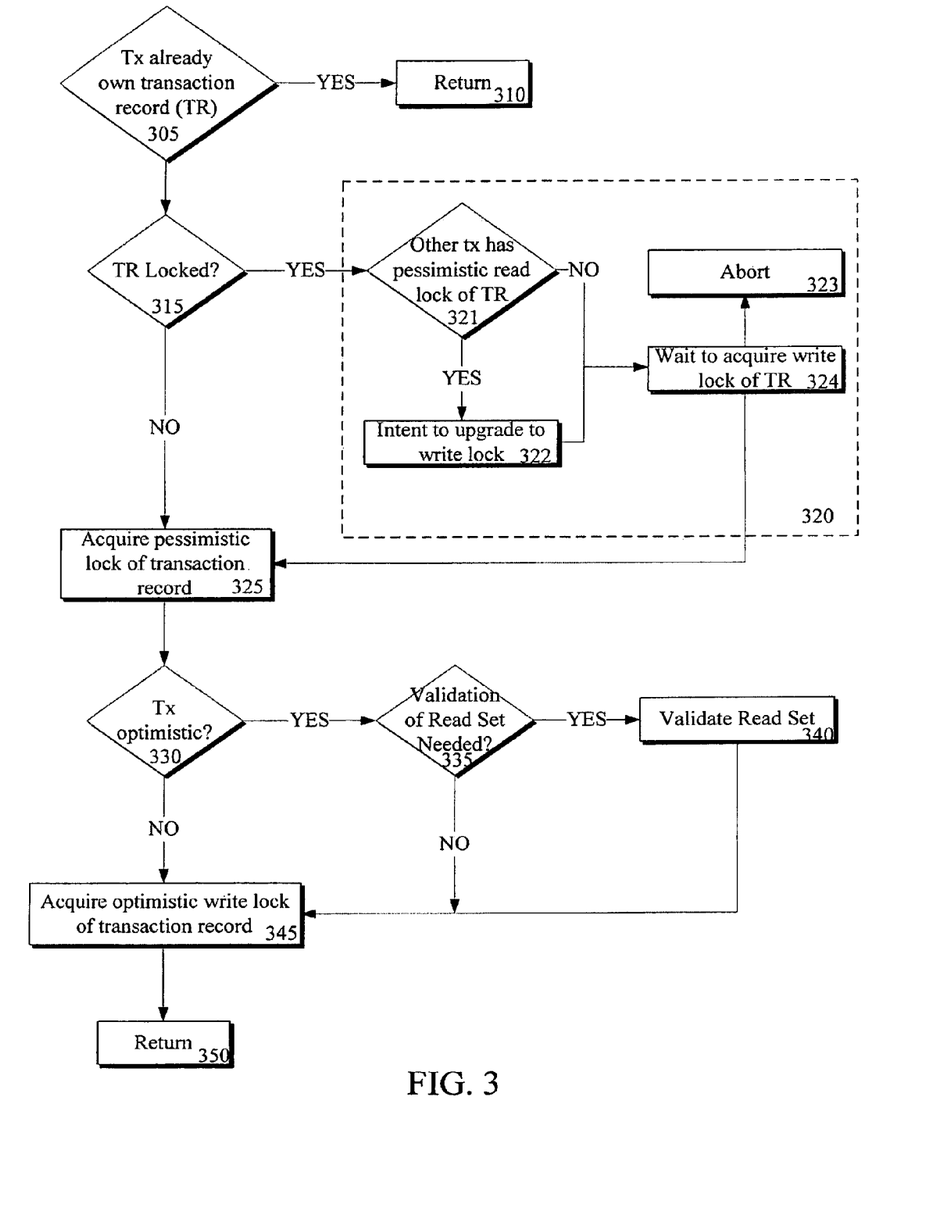
FIG. 3 illustrates an embodiment of a flow diagram for a unified concurrency control write barrier.
Figure 4:
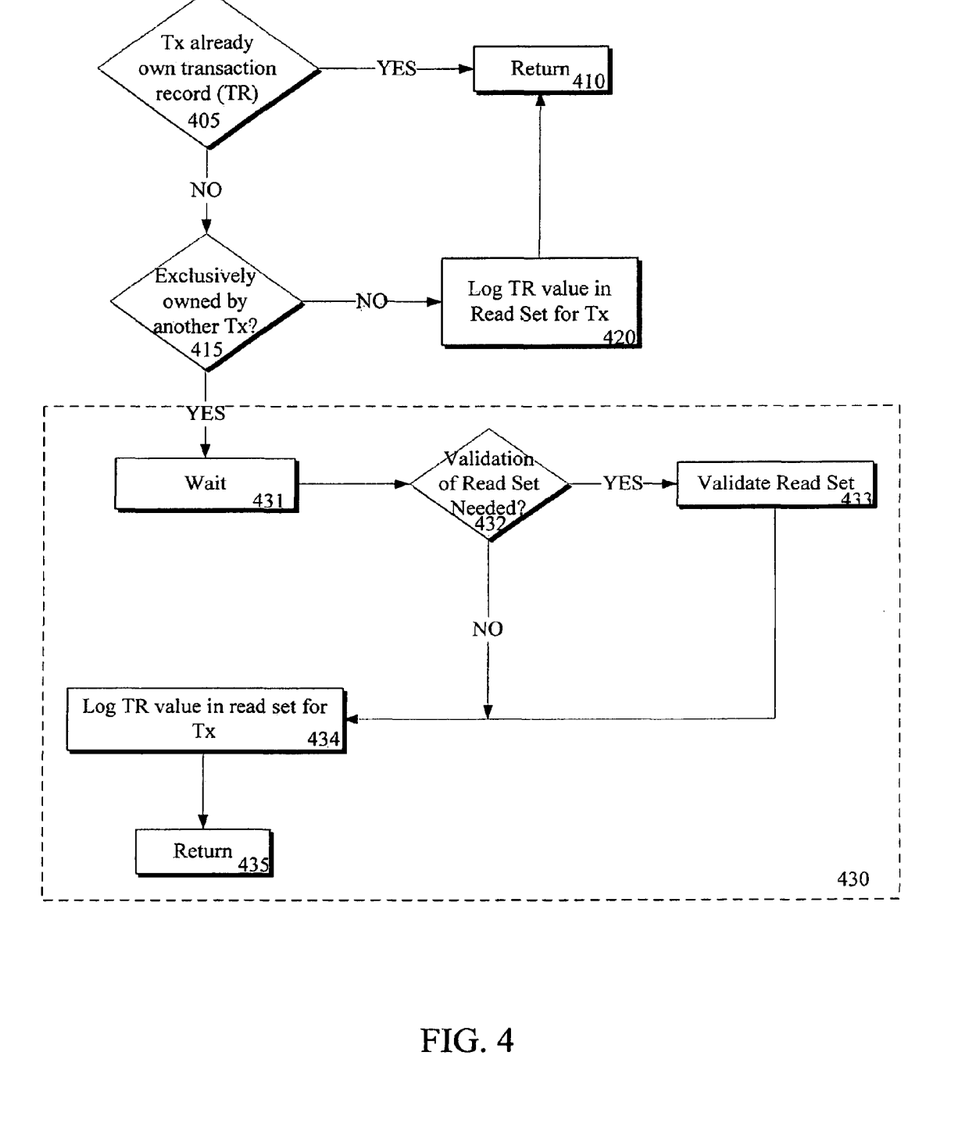
FIG. 4 illustrates an embodiment of a flow diagram for an optimistic read barrier.
Figure 5:
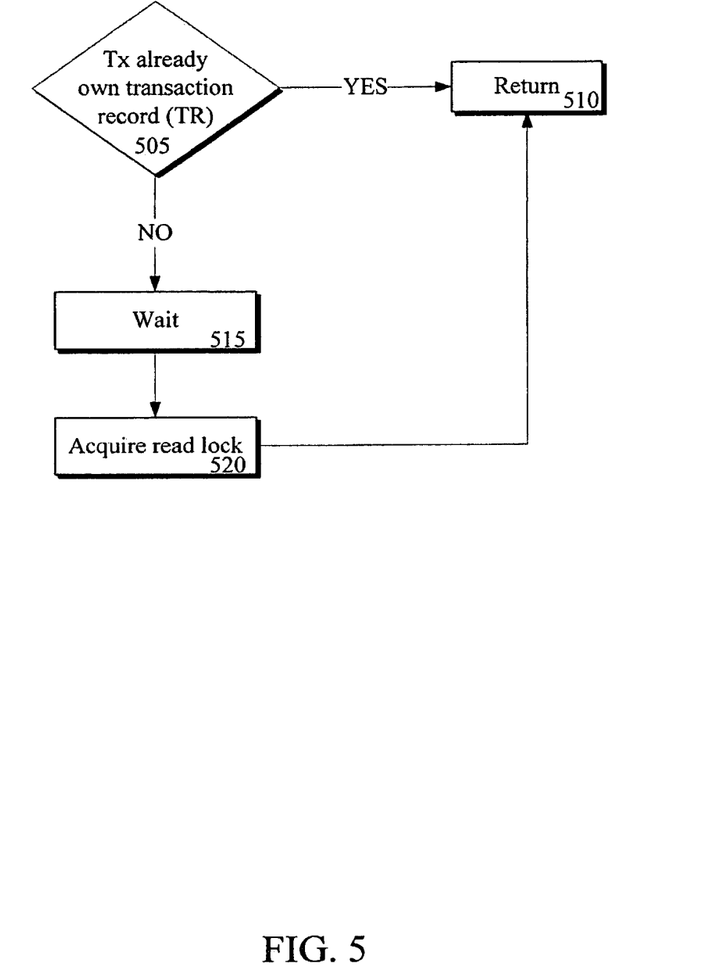
FIG. 5 illustrates an embodiment of a flow diagram for a pessimistic read barrier.

Turning to FIG. 3, an embodiment of a flow diagram for a unified concurrency control write barrier is illustrated. Note that the flows in FIGS. 3-6 are illustrated in a substantially serial fashion. However, the illustrated flows may be performed in a different order, as well as potentially in parallel. Furthermore, FIGS. 3-5 illustrate specific embodiments of access barriers and operations that may be performed therein. Yet, other known transactional operations that are not illustrated may also be performed in conjunction with or in the place of the illustrated flows.

An exemplary entry point for a write barrier is illustrated below in pseudo code A utilizing a template to generalize across different data types:

```
Pseudo Code A: An embodiment of pseudo code
              for an entry point to a write barrier void write##TYPE(TxnDesc* txnDesc,TYPE* addr,TYPE val) {
    acquireLockFast(txnDesc,addr);
    if (spansMblks##SIZE(addr))
        acquireLockFast(txnDesc,addr+1);
    logUndo##TYPE(txnDesc, addr);
    *addr = val;
}
```

Here, the write barrier attempts to acquire exclusive ownership of data blocks containing the accessed data utilizing an acquireLockFast function and then logs the old value in an undo log before performing the write. As discussed above, the call, acquireLockFast (txnDes, addr), may be included in main program code, and the acquireLockFast function is provided in other program code, such as a transactional runtime library. The pseudo code also includes a capability of handling accesses that span more than one cache line with the spansMblks function.

To further discussion of the flow illustrated in FIG. 3, exemplary pseudo code for a write barrier is included immediately below in pseudo code B.

```
Pseudo Code (PC) B: An embodiment of pseudo code for a unified write barrier 1  acquireLockFast(TxnDesc *txnDesc, void *addr) {
2      TxnRec *txnRecPtr = getTxnRecPtr(addr);
3      TxnRec txnRec = txnRecPtr->pessimisticTxnRec;
4      if (tnxRecPtr->optimisticTxnRec == txnDesc)
5          return; /* already have exclusive ownership */
6      if ( isPessimisticTxnRecOwned(txnRec) ||
7          ! CAS(&txnRecPtr->pessimisticTxnRec,txnRec,txnDesc->readerMask))
8      /*
9       * owned exclusively by another transaction, read-locked (possibly
10      * by this trasaction), or compare-and-exchange failed
11      */
12         acquireLockSlow(txnDesc,addr);
13     /* Successfully acquired exclusive ownership of the pessimistic TxnRec */
14     logWrite(txnDesc, txnRecPtr); /* record in write set */
15     if (isOptimisticTxn(txnDesc) &&    /* only for optimistic transactions */
16         txnRecPtr->optimisticTxnRec > txnDesc->localTimeStamp) {
17         validate(txnDesc);
18     }
19     txnRecPtr->optimisticTxnRec = txnDesc; /* lock the optimistic TxnRec */
20 }
21 void validate(TxnDesc* txnDesc) {
22     TxnRec ts = globalTimeStamp;
23     for (txnRecPtr in txnDesc->readSet) {
24         txnRec = txnRecPtr->optimisticTxnRec;
25         if (isOptimisticTxnRecWriteLocked(txnRec)) {
26             if (txnRec != txnDesc) abort( ):
27         } else {
28             if (txnRec > txnDesc->localTimeStamp) abort ( );
29         }
30     }
31     txnDesc->localTimeStamp = ts;
32 }
33
34 acquireLockSlow(TxnDesc *txnDesc,void *addr) {
35     TxnRec *txnRecPtr = getTxnRecPtr(addr);
36     TxnRec txnRec = txnRecPtr->pessimisticTxnRec;
37     while ((isPessimisticTxnRecOwned(txnRec) &&
38            !isReadLockedOnlyByMe(txnRec,txnDesc)) /* pessimistic only */
39            ||
40            !CAS(&txnRecPtr->pessimisticTxnRec,txnRec,txnDesc->readerMask) )
```

| | Pseudo Code (PC) B: An embodiment of pseudo code for a unified write barrier |
|---|---|
| 41 | { |
| 42 | handleConflict(txnDesc,txnRecPtr); /* also checks for reader upgrade */ |
| 43 | txnRec = txnRecPtr->pessimisticTxnRec; /* reload */ |
| 44 | } |
| 45 | } |

Note that the pseudo code is an illustrative embodiment of the flow of FIG. 3, and as stated above, operations illustrated in the pseudo code and the flow of FIG. 3 may be performed in a different order, in conjunction with other operations, or not performed at all. Furthermore, the write barrier in Pseudo Code B is split into two main portions, i.e. a fast path and a slow path. With regard to FIG. 3, the flow diagram is similarly split with slow path being included in path 320 and a fast path with flows 305-345 without flow 320. Note that the use of a fast path and a slow path for a write barrier is purely illustrative.

With regard to the flows and pseudo code, the fast path checks if a transaction associated with the write operation, already has exclusive ownership of a transaction record associated with the address referenced by the write operation in flow 305 (lines 4-5 of PC B). Here, if the optimistic field of the transaction record references a transaction descriptor for the transaction, then the transaction already owns the transaction record. If the transaction already has exclusive ownership, the fast path function immediately returns in flow 310 to the entry point for performance of the write.

However, if the transaction does not already have exclusive ownership, then in flows 315 and 325 (PC B lines 6-11), the write barrier attempts to acquire ownership of the pessimistic field of the transaction record if no other transaction already has exclusive ownership and no transaction has read-locked the transaction record. If the transaction record has been locked, i.e. write locked by another transaction or read locked by another transaction, or the compare exchange on the pessimistic field failed, then the acquireLockSlow function is called (lines 12 of PC B).

If the transaction record was owned by another transaction, read-locked, or the compare-and-exchange failed, then slow path 320 is called in line 12 of PC B. The slow path loops in flow 324 (PC B 37-40) until it acquires write ownership of the pessimistic field of the transaction record and then returns. In addition, the slow path through use of the handleConflict function handles upgrading to write locks and conflicts with other readers and/or writers. As an example, in flow 321 it is determined if another transaction has a pessimistic read lock of the transaction record, i.e. the LSB is set to an unlocked value and the upper bit vector includes bit set to indicate there are other readers. If read locked, then the second LSB is set to indicate an intent to upgrade to a write lock. Either way, the slow path either acquires the pessimistic lock of the transaction record and returns to the fast path in flow 325 or aborts in flow 323.

When the ownership of the pessimistic field has been successfully acquired, either through the fast path or the slow path, then the write is logged in the write set (line 14 of PC B). For example, a reference to the transaction record for the referenced memory address is logged in the write set.

In one embodiment, for optimistic transactions, a form of on demand validation is performed, i.e. checking whether the optimistic field of the transaction record holds a later version/timestamp than the local timestamp of the transaction. In other words, if another transaction has committed and updated the version of the optimistic field of the transaction after the current transaction started, then the read set is validated to ensure the transaction is still valid and does not need to be aborted in flows 330-340 (lines 15-18 of PC B). Validation of the read set often includes comparing logged version values from the read set with associated current values of transaction records and potentially updating the local timestamp in response to a successful validation. An example of a validate function is included in PC B lines 21-32.

In another embodiment, a write barrier for unified concurrency control includes separate write barriers, i.e. a call to an optimistic write barrier for an optimistic transaction and a call to a pessimistic write barrier for a pessimistic transaction. In this embodiment, the need to check if the transaction is optimistic is potentially eliminated. Here, the write barriers are mostly replicated with the validation operations within optimistic version of the write barrier and omitted from the pessimistic version of the write barrier.

Whether on demand validation is performed for an optimistic transaction or not, an optimistic lock for the transaction record is then acquired in flow 345 (PC B line 19). In one embodiment, acquiring the optimistic lock of the transaction record includes updating the optimistic field of the transaction record to a pointer to this transaction's descriptor. Note in this pseudo code the potential advantage of acquiring and releasing locks in this order, i.e. a compare exchange is performed for acquiring a lock on the pessimistic field, while a more efficient store operation is utilized for acquiring the lock of the optimistic field. Once the write barrier completes, it returns to the entry point, where the write is then performed.

Referring next to FIG. 4, an embodiment of a flow diagram for an optimistic read barrier is illustrated. Similar to the discussion of FIG. 3, an embodiment of pseudo code for a read barrier is included below in pseudo code (PC) C.

| | Pseudo Code (PC)-C: An embodiment of pseudo code for an optimistic read barrier |
|---|---|
| 1 | TYPE readOptimistic##TYPE(TxnDesc* txnDesc,TYPE* addr) { |
| 2 | TYPE val = *addr; |
| 3 | volatile TxnRec* txnRecPtr = getTxnRecPtr(addr); |
| 4 | TxnRec txnRec = txnRecPtr->optimisticTxnRec; |
| 5 | if (isOptimisticTxnRecWriteLocked(txnRec) \|\| |
| 6 | txnDesc->localTimeStamp < txnRec ) { |
| 7 | if (txnRec == txnDesc) return val; |
| 8 | return readSlowOptimistic##TYPE(txnDesc,addr); |
| 9 | } |
| 10 | logRead(txnDesc, txnRecPtr); |
| 11 | return val; |
| 12 | } |
| 13 | |
| 14 | TYPE readSlowOptimistic##TYPE(TxnDesc* txnDesc,TYPE* addr) |
| 15 | { |
| 16 | volatile TxnRec *txnRecPtr = getTxnRecPtr(addr); |
| 17 | TxnRec txnRec; |
| 18 | Type val; |
| 19 | do { |
| 20 | txnRec = txnRecPtr->optimisticTxnRec; |
| 21 | val = *addr; |

Pseudo Code (PC)-C:
An embodiment of pseudo code for an optimistic read barrier

```
22      } while (!validateAndLog(txnDesc,txnRecPtr,txnRec));
23      return val;
24  }
25
26  int validateAndLog(TxnDesc* txnDesc,TxnRec*
    txnRecPtr,TxnRec txnRec)
27  {
28      if ( isOptimisticTxnRecWriteLocked(txnRec) ||
29          !checkReadConsistency(txnDesc, txnRecPtr, txnRec) ) {
30          handleConflict(txnDesc, txnRecPtr);
31          return 0;
32      }
33      logRead(txnDesc,txnRecPtr);
34      return 1;
35  }
36
37  int checkReadConsistency(TxnDesc* txnDesc,TxnRec*
    txnRecPtr,TxnRec txnRec)
38  {
39      if (txnRec > txnDesc->localTimeStamp)
40          validate(txnDesc);
41      return *txnRecPtr == txnRec;
42  }
```

Similar to the discussion of the write barrier in FIG. 3, the optimistic read barrier is logically split into a fast path including flows 405-420 and slow path 430. Again, in flow 405 it is determined if a transaction record (TR) associated with a memory address referenced by a transaction read operation within this transaction is already owned by this transaction (PC-C lines 5-6). If the TR is already owned, then the optimistic read function returns (PC-C line 7) and the read is performed. Furthermore, if the transaction record is not owned by any other transaction (PC-C lines 5-6), then the transaction record value is logged and then the function returns. Note that in one embodiment, as illustrated in lines 5-6 of PC-C, an additional descriptor that the transaction record is not owned by any transaction with an earlier timestamp may also be included.

In contrast, all other states of the transaction record are relegated to the slow path 430 (PC-C readSlowOptimistic). The slow path 430 loops in flow 431 reading the transaction record and data until the transaction record is not locked by another transaction (PC-C line 22). The validateAndLog function called in the loop is to ensure the transaction record is not owned and to post-validate the transaction record utilizing the checkReadConsistency function, i.e. the transaction read set is consistent with the transaction record's timestamp and that the transaction record's value has not changed.

Turning to FIG. 5 an embodiment of a pessimistic read barrier is illustrated. For discussion of FIG. 5 exemplary pseudo code (PC)-D has also been included below.

Pseudo Code (PC)-D:
An embodiment of pseudo code for a pessimistic read barrier

```
1   TYPE readPessimistic##TYPE(TxnDesc* txnDesc,TYPE* addr) {
2       TxnRec* txnRecPtr = getTxnRecPtr(addr);
3       TxnRec txnRec = txnRecPtr->pessimisticTxnRec;
4       if (!isLockedByMe(txnDesc,txnRec)) {
5           return readSlowPessimistic##TYPE(txnDesc,txnRecPtr);
6       }
7       /* txn has read or write lock already */
8       return *addr;
9   }
10
11  TYPE readSlowPessimistic##TYPE(TxnDesc* txnDesc,TxnRec*
    txnRecPtr) {
12      TxnRec txnRec = txnRecPtr->pessimisticTxnRec;
13      while (isWriteLockedOrUpgradeRequested(txnRec) ||
14          !CAS(&txnRecPtr-
15          >pessimisticTxnRec,txnRec,txnRec^txnDesc->readerMask))
16      {
17          handleConflict(txnDesc,txnRecPtr);
18          txnRec = txnRecPtr->pessimisticTxnRec;
19      }
20      logRead(txnDesc,txnRecPtr);
21      return *addr;
22  }
23
24  }
```

Similar to the optimistic read barrier, it is determined if the transaction already owns the transaction record and returns in flows 505-510 (PC-D lines 4-5). Otherwise, the readSlowPessimistic function is called. The slow path essentially loops in flow 515 until it acquires a read lock (PC-D lines 4-5). In one embodiment, the slow path also provides priority to transactions upgrading from a read to write lock with the handleConflict function. As stated above, acquiring a read lock, as in flow 520, potentially includes setting a bit corresponding to this transaction in the upper bit vector of the pessimistic field to a read locked value.

Figure 6:
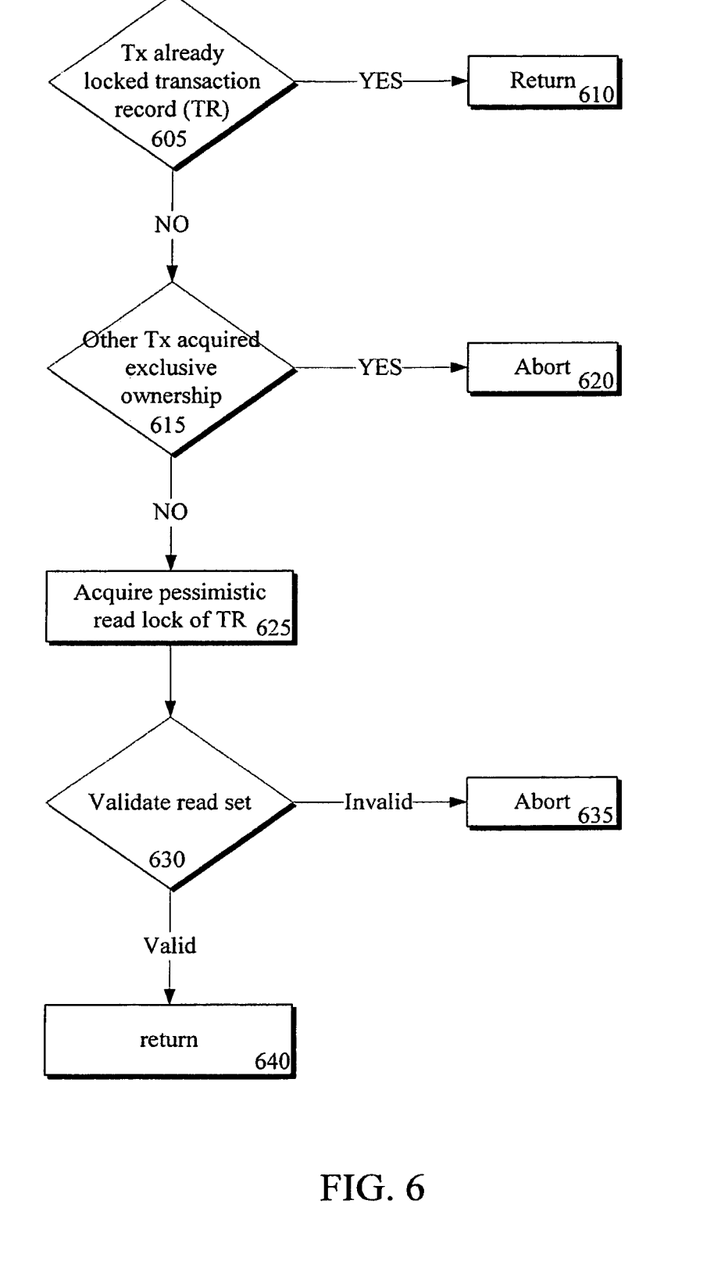
FIG. 6 illustrates an embodiment of a flow diagram for switching concurrency control modes part-way through execution of a transaction.

With reference to FIG. 6, an embodiment of a flow diagram for switching modes part-way through a transaction is illustrated. As mentioned above, in one embodiment, it is dynamically determined if a transaction is to be executed optimistically and/or pessimistically. A compiler may make an initial determination about the mode of execution for a transaction either through a default mode of execution or some other known intelligent selection method. However, whether or not there is a predetermined mode of execution for a transaction, the determination of whether to execute a transaction optimistically or pessimistically may also be made during runtime.

Determining a mode of execution for a transaction, whether during initial compilation or during runtime, in one embodiment, is based on one or more characteristics of a transaction. A non-exhaustive list of illustrative transaction characteristics include a number of failures associated with the transaction, a performance heuristic associated with the transaction, a privatization nature of the transaction, an irrevocable nature of the transaction, and an obstinate nature of the transaction.

When execution of a transaction is switched from one mode, such as optimistic, to a second mode, such as pessimistic, in one embodiment, barriers are also updated, accordingly. During compilation, calls, such as indirect calls to access barriers, are inserted at transactional memory accesses. Therefore, the inserted calls may be updated in response to switching modes. For example, assume a call to an optimistic read barrier is present at a transactional read operation within a transaction and that the transaction has failed a predetermined number of times during previous execution. As a result, during a subsequent execution of the transaction, it is determined that the transaction is to be executed pessimistically. In response to this dynamic determination, the call from the optimistic read barrier is updated/modified to a call to a pessimistic read barrier. In one embodiment, updating the call includes modifying a pointer of an indirect call to the optimistic read barrier to point/reference the pessimistic read barrier.

A dynamic determination of a mode of execution, in one embodiment, is made at an entry point of a transaction. However, dynamic determination is not so limited, as a transaction may be capable of switching modes part-way through a transaction. For example, assume a transaction is initially being optimistically executed. However, part-way through the transaction, the transaction becomes an obstinate transaction. As a consequence, some bookkeeping is potentially done to ensure valid data. The flow of FIG. 6 is discussed below in reference to included pseudo code (PC-E).

Pseudo Code (PC)-E: An embodiment of pseudo code for mode switching

```
1  void validateAndAcquireReadLocks(TxnDesc* txnDesc) {
2    for (txnRecPtr in txnDesc->readSet) {
3      while (1) {
4        TxnRec txnRec = txnRecPtr->pessimisticTxnRec;
5        if (isLockedByMe(txnDesc,txnRec))
6          break;    /* txn has read or write lock already */
7        if (isWriteLocked(txnRec))
8          /*
9           * some other txn has acquired exclusive write
10          * ownership could add a check to see if an upgrade
11          * has been requested to give more priority to writes.
12          */
13          abort( );
14        if (CAS(&txnRecPtr->pessimisticTxnRec,
15               txnRec,txnRec txnDesc->ownerMask)) {
16          /* pessimisicTxnRec is now read-locked by me */
17          if (txnRecPtr->optimisticTxnRec >
                 txnDesc->localTimeStamp)
18            /*
19             * another txn updated optimisticTxnRec sincelast
20             * validation read set is invalid
21             */
22            abort ( );    /* be careful on abort because some but not
23                           * necessarily all of
24                           * the read set elements are read-locked */
25          break;
26  } } } }
```

Essentially, in response to a determination that an optimistic transaction is to switch to a pessimistic transaction, the validateAndAcquireReadLocks function validates the read set and acquires pessimistic read locks for the entries of the read set. Here, if the transaction already owns the transaction records for the previous reads of the transaction in flow 605, then the loop continues in flow 610 as no validation is performed (PC-E lines 5-6). However, if not already owned, but some other transaction has acquired exclusive ownership in flow 615, then the transaction aborts as the read set may not be valid (PC-E lines 7-13).

In contrast, if another transaction does not have exclusive ownership, then in flow 625, ownership of the pessimistic fields of the transaction records for the previous reads are acquired, i.e. pessimistic shared read locks are acquired, (PC-E lines 14-16). Furthermore, the read set may be validated to ensure there has been no update since the last validation in flow 630 (PC-E line 17). If the read set is not valid, then the transaction aborts in flow 635 (PC-E lines 22-24). Otherwise the read set is valid and loop continues in flow 640, so the transaction may be completed in a pessimistic mode of execution.

Therefore, as can be seen from above, maintenance of optimistic and pessimistic transaction records in a unified manner enables concurrent execution of optimistic and pessimistic transactions. For example, an optimistic transactional load reads from a memory address based on the optimistic field of a transaction record, while a pessimistic transaction load may perform a read of the memory address in parallel utilizing a shared pessimistic read lock of the pessimistic field of the transaction record. Furthermore, the system is potentially not limited to executing transaction within the same initial mode. Dynamic determination of an execution mode based on performance or the nature of the transaction, allows for efficient execution of a transaction in the most beneficial mode. In addition, even part-way through a transaction, the transaction may be capable of switching modes to provide the greatest flexibility in modes of execution.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level, which may include relative voltages levels. For example, 400 mV may be a low logic level, while 800 mV is deemed a high logical level in regards to an approximate threshold value of 600 mV. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage device or other form of non-transitory storage for information from propagated signals (e.g., carrier waves, infrared signals, digital signals); etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A non-transitory machine readable medium including program code which, when executed by a machine, causes the machine to perform the operations of:
    encountering an operation associated with a transactional memory access to a data element; and
    maintaining a meta-data location associated with the data element in response to encountering the operation associated with the transactional memory access to the data element, wherein the meta-data location comprises a first field to hold an optimistic concurrency control value and a second field to hold a pessimistic concurrency control value, the pessimistic concurrency control value is to include a first pessimistic field to hold a bit vector to correspond to pending transactions and a second pessimistic field to indicate a lock type, wherein a pending writer transaction is to set a corresponding bit in the bit vector and the second pessimistic field to a pessimistic write lock value to acquire a write lock of the data element.

2. The machine readable medium of claim 1, wherein the operation associated with the transactional memory access includes a call to an access barrier for the transactional memory access.

3. The machine readable medium of claim 1, wherein the optimistic concurrency control value includes a version value to indicate the data element is optimistically unlocked or an optimistic write lock value to indicate the data element is optimistically write locked.

4. The machine readable medium of claim 3, wherein the optimistic write lock value includes a value selected from a group consisting of a pointer to a transaction descriptor, a pointer to a write set entry, and a binary lock value.

5. The machine readable medium of claim 3, wherein the version value includes a bit set to a first logical value to indicate the data element is optimistically unlocked and the optimistic write lock value includes the a bit set to a second logical value to indicate the data element is optimistically write locked.

6. The machine readable medium of claim 3, wherein the second pessimistic field is to hold a shared read lock value, a read lock with intent to upgrade value, or the pessimistic write lock value.

7. The machine readable medium of claim 6, wherein a bit of the bit vector corresponding to a pending reader transaction of the pending transactions is to be set to a first logical value to represent the corresponding transaction has acquired a shared read lock or a read lock with intent to upgrade.

8. The system of claim 6, wherein a bit of the bit vector corresponding to a pending reader transaction of the pending transactions is to be set to a first logical value to represent the corresponding transaction has acquired a shared read lock or a read lock with intent to upgrade.

9. A non-transitory, machine readable medium including program code which, when executed by a machine, causes the machine to perform the operations of:
    in response to encountering an operation associated with a transactional write operation referencing a data element:
    acquiring ownership of a first field of a transaction record associated with the data element; and
    acquiring ownership of a second field of the transaction record after acquiring ownership of the first field of the transaction record, wherein:
        the first field of the transaction record includes a pessimistic field to hold a pessimistic concurrency control value and the second field of the transaction record includes an optimistic field to hold an optimistic concurrency control value;
        acquiring ownership of the pessimistic field of the transaction record includes executing a first instruction to determine if an ownership value held in the pessimistic field of the transaction record indicates the pessimistic field is not locked and to modify the pessimistic field to hold a pessimistic locked value in response to determining the ownership value indicates the pessimistic field is not locked; and
        acquiring ownership of the optimistic field of the transaction record after acquiring ownership of the pessimistic field of the transaction record comprises executing a store operation to store an optimistic locked value in the optimistic field.

10. The machine readable medium of claim 9, wherein the operation associated with the transaction write operation includes a call to a transactional write barrier for the transactional write operation.

11. The machine readable medium of claim 9, wherein the program code which, when executed by the machine, causes the machine, in response to encountering the transactional write operation referencing the date element, to further perform the operations of:
    performing the transactional write operation;
    releasing ownership of the second field of the transaction record; and
    releasing ownership of the first field of the transaction record after releasing ownership of the second field of the transaction record.

12. The machine readable medium of claim 11, wherein releasing ownership of the optimistic field of the transaction record includes updating the optimistic field to an optimistic unlocked value, and wherein releasing ownership of the pessimistic field of the transaction record includes updating the pessimistic field to a pessimistic unlocked value.

13. The machine readable medium of claim 12, wherein updating the optimistic field to the optimistic unlocked value comprises updating the optimistic field to a version value, and wherein updating the pessimistic field to the pessimistic unlocked value comprises resetting, to a default value, a bit position in the pessimistic field associated with a transaction including the transaction write operation and resetting an ownership bit in the pessimistic field to a default unlocked value.

14. The machine readable medium of claim 9, wherein the first instruction includes a compare and exchange instruction.

15. A system comprising:
a processor; and
a memory having code stored therein that, in response to execution by the processor, causes the processor to:
encounter an operation associated with a transactional memory access to a data element; and
maintain a meta-data location associated with the data element in response to encountering the operation associated with the transactional memory access to the data element, wherein the meta-data location comprises a first field to hold an optimistic concurrency control value and a second field to hold a pessimistic concurrency control value, the pessimistic concurrency control value is to include a first pessimistic field to hold a bit vector to correspond to pending transactions and a second pessimistic field to indicate a lock type, wherein a pending writer transaction is to set a corresponding bit in the bit vector and the second pessimistic field to a pessimistic write lock value to acquire a write lock of the data element.

16. The system of claim 15, wherein the operation associated with the transactional memory access includes a call to an access barrier for the transactional memory access.

17. The system of claim 15, wherein the optimistic concurrency control value includes a version value to indicate the data element is optimistically unlocked or an optimistic write lock value to indicate the data element is optimistically write locked.

18. The system of claim 17, wherein the optimistic write lock value includes a value selected from a group consisting of a pointer to a transaction descriptor, a pointer to a write set entry, and a binary lock value.

19. The system of claim 17, wherein the version value includes a bit set to a first logical value to indicate the data element is optimistically unlocked and the optimistic write lock value includes the a bit set to a second logical value to indicate the data element is optimistically write locked.

20. The system of claim 17, wherein the second pessimistic field is to hold a shared read lock value, a read lock with intent to upgrade value, or the pessimistic write lock value.

21. A system comprising:
a processor; and
a memory having code stored therein that, in response to execution by the processor, causes the processor to, in response to encounter an operation associated with a transactional write operation referencing a data element:
acquire ownership of a first field of a transaction record associated with the data element wherein the first field of the transaction record includes a pessimistic field to hold a pessimistic concurrency control value; and
acquire ownership of a second field of the transaction record after acquiring ownership of the first field of the transaction record, wherein the second field of the transaction record includes an optimistic field to hold an optimistic concurrency control value,
wherein to acquire ownership of the pessimistic field of the transaction record includes to execute a first instruction to determine if an ownership value held in the pessimistic field of the transaction record indicates the pessimistic field is not locked and to modify the pessimistic field to hold a pessimistic locked value in response to determination that the ownership value indicates the pessimistic field is not locked, and
wherein to acquire ownership of the optimistic field of the transaction record after acquiring ownership of the pessimistic field of the transaction record comprises to execute a store operation to store an optimistic locked value in the optimistic field.

22. The system of claim 21, wherein the operation associated with the transaction write operation includes a call to a transactional write barrier for the transactional write operation.

23. The system of claim 21, wherein the code, in response to execution by the processor, further causes the processor to in response to encounter an operation associated with a transactional write operation referencing a data element:
perform the transactional write operation;
release ownership of the second field of the transaction record; and
release ownership of the first field of the transaction record after releasing ownership of the second field of the transaction record.

24. The system of claim 23, wherein to release ownership of the optimistic field of the transaction record includes to update the optimistic field to an optimistic unlocked value, and wherein to release ownership of the pessimistic field of the transaction record includes to update the pessimistic field to a pessimistic unlocked value.

25. The system of claim 24, wherein to update the optimistic field to the optimistic unlocked value comprises to update the optimistic field to a version value, and wherein to update the pessimistic field to the pessimistic unlocked value comprises to reset, to a default value, a bit position in the pessimistic field associated with a transaction including the transaction write operation and to reset an ownership bit in the pessimistic field to a default unlocked value.

26. The system of claim 21, wherein the first instruction includes a compare and exchange instruction.

* * * * *